United States Patent
Horikoshi et al.

(10) Patent No.: US 11,171,573 B2
(45) Date of Patent: Nov. 9, 2021

(54) POWER CONVERSION APPARATUS AND CONTROL METHOD OF THE SAME

(71) Applicant: FANUC CORPORATION, Minamitsuru-gun (JP)

(72) Inventors: Shinichi Horikoshi, Yamanashi-ken (JP); Koujirou Sakai, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/925,155

(22) Filed: Jul. 9, 2020

(65) Prior Publication Data
US 2021/0021205 A1 Jan. 21, 2021

(30) Foreign Application Priority Data
Jul. 17, 2019 (JP) .............................. JP2019-132085

(51) Int. Cl.
*H02M 7/155* (2006.01)
*H02M 1/34* (2007.01)

(52) U.S. Cl.
CPC .......... *H02M 7/1557* (2013.01); *H02M 1/34* (2013.01); *H02M 1/348* (2021.05)

(58) Field of Classification Search
CPC .. H02M 7/155; H02M 7/1557; H02M 7/1555; H02M 1/34; H02M 1/342; H02M 1/344; H02M 1/346; H02M 1/348
See application file for complete search history.

(56) References Cited

U.S. PATENT DOCUMENTS

| | | | | |
|---|---|---|---|---|
| 5,491,624 A * | 2/1996 | Levran | ................... | H02M 7/219 363/44 |
| 6,038,155 A * | 3/2000 | Pelly | ....................... | H02M 1/36 363/125 |
| 2007/0297202 A1* | 12/2007 | Zargari | .................... | H02M 1/32 363/50 |
| 2014/0312810 A1 | 10/2014 | Toda et al. | | |
| 2021/0028720 A1* | 1/2021 | Sakai | ....................... | H02M 1/44 |

FOREIGN PATENT DOCUMENTS

| | | |
|---|---|---|
| JP | 2005-117777 A | 4/2005 |
| JP | 2013-158232 A | 8/2013 |
| JP | 2016-027774 A | 2/2016 |
| JP | 2019-013148 A | 1/2019 |

* cited by examiner

*Primary Examiner* — Adolf D Berhane
(74) *Attorney, Agent, or Firm* — McGinn IP Law Group, PLLC

(57) ABSTRACT

A power conversion apparatus includes: a converter converting AC voltage supplied from an AC power supply via a switch unit, into DC voltage; a smoothing capacitor smoothing the DC voltage output from the converter; a resistor suppressing electric current flowing into the smoothing capacitor; a switch short-circuiting the both ends of the resistor; a filter including reactors and capacitors and that removes noise; and a control unit controlling opening and closing of the switch unit and the switch. The control unit changes the switch unit from the open state to the closed state with the switch in an open state if the voltage across the smoothing capacitor is lower than a voltage threshold, and changes the switch unit from the open state to the closed state with the switch in an closed state if the voltage across the smoothing capacitor is equal to or greater than the voltage threshold.

5 Claims, 4 Drawing Sheets

POWER CONVERSION APPARATUS AND CONTROL METHOD OF THE SAME

CROSS-REFERENCE TO RELATED APPLICATION

This application is based upon and claims the benefit of priority from Japanese Patent Application No. 2019-132085 filed on Jul. 17, 2019, the contents of which are incorporated herein by reference.

BACKGROUND OF THE INVENTION

Field of the Invention

The present invention relates to a power conversion apparatus and a control method thereof.

Description of the Related Art

Japanese Laid-Open Patent Publication No. 2019-013148 discloses a power conversion apparatus that stops switching of a converter if the input voltage to the converter is equal to or greater than a set value. According to Japanese Laid-Open Patent Publication No. 2019-013148, it is possible to contribute to prevention against breakage of electric components.

SUMMARY OF THE INVENTION

However, the technology described in Japanese Laid-Open Patent Publication No. 2019-013148 is not always effective in preventing damage to the switching elements and the like provided in the converter.

It is therefore an object of the present invention to provide a power conversion apparatus and a control method thereof that can favorably prevent switching elements and others from being broken.

According to one aspect of the present invention, a power conversion apparatus includes: a converter configured to convert alternate-current (AC) voltage supplied from an AC power supply via a switch unit, into direct-current (DC) voltage; a smoothing capacitor configured to smooth the DC voltage output from the converter; a resistor disposed between the converter and the smoothing capacitor, and configured to suppress electric current flowing into the smoothing capacitor; a switch connected in parallel with the resistor and configured to short-circuit both ends of the resistor; a filter including reactors and capacitors, and disposed between the switch unit and the converter, the filter being configured to remove noise; and a control unit configured to control opening and closing of the switch unit and the switch. The control unit is configured to change the switch unit from an open state to a closed state with the switch being in an open state if the voltage across the smoothing capacitor is lower than a voltage threshold, and is configured to change the switch unit from the open state to the closed state with the switch being in a closed state if the voltage across the smoothing capacitor is equal to or greater than the voltage threshold.

Another aspect of the present invention is a control method of a power conversion apparatus including: a converter configured to convert AC voltage supplied from an AC power supply via a switch unit, into DC voltage; a smoothing capacitor configured to smooth the DC voltage output from the converter; a resistor disposed between the converter and the smoothing capacitor and configured to suppress electric current flowing into the smoothing capacitor; a switch connected in parallel with the resistor and configured to short-circuit both ends of the resistor; a filter including reactors and capacitors, and disposed between the switch unit and the converter, the filter being configured to remove noise; and a control unit configured to control opening and closing of the switch unit and the switch, and the control method includes: a step of determining whether or not a voltage across the smoothing capacitor is equal to or greater than a voltage threshold; and a step of changing the switch unit from an open state to a closed state. In this method, the step of changing the switch unit from the open state to the closed state includes changing the switch unit from the open state to the closed state with the switch being in an open state if the voltage across the smoothing capacitor is lower than the voltage threshold, and changing the switch unit from the open state to the closed state with the switch being in a closed state if the voltage across the smoothing capacitor is equal to or greater than the voltage threshold.

According to the present invention, it is possible to provide a power conversion apparatus and a control method thereof that can favorably prevent switching elements and others from being broken.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A power conversion apparatus and a control method thereof according to the present invention will be detailed below by describing a preferred embodiment with reference to the accompanying drawings.

Embodiment

Figure 1:
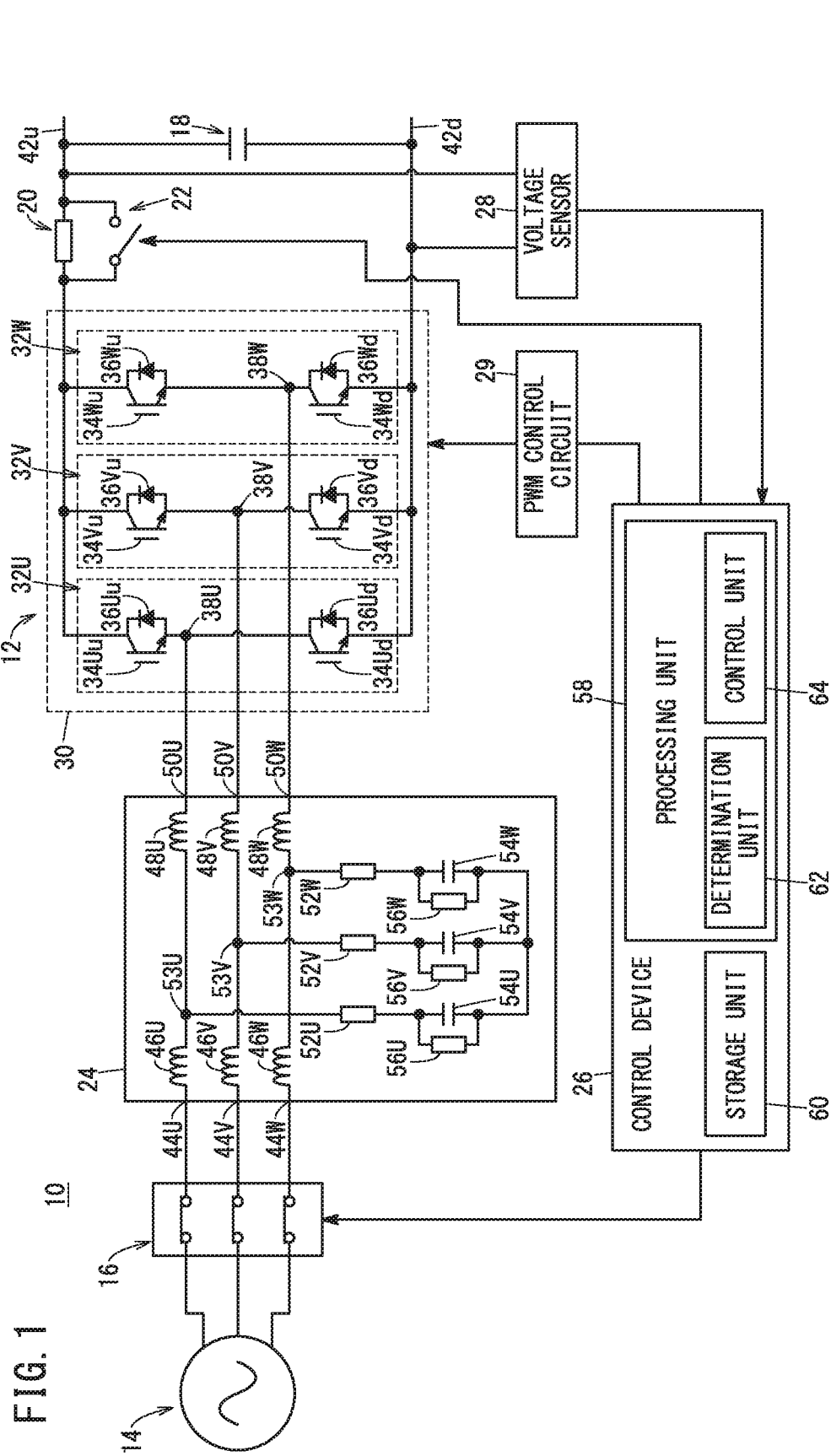
FIG. 1 is a diagram showing a configuration of a power conversion apparatus according to an embodiment.

A power conversion apparatus and a control method thereof according to an embodiment will be described with reference to FIGS. 1 to 3. FIG. 1 is a diagram showing a configuration of the power conversion apparatus according to the present embodiment.

As shown in FIG. 1, a power conversion apparatus 10 according to the present embodiment includes a converter 12. The converter 12 converts AC (alternate-current) voltage supplied from an AC power supply 14 via a switch unit 16, into DC (direct-current) voltage. The converter 12 is, for example, a known pulse width modulation (PWM) converter, but is not limited to this.

The AC power supply 14 is, for example, a multiphase AC power supply that supplies multiphase voltage, more specifically, a three-phase AC power supply, but is not limited to this. The AC power supply 14 can supply, for example, U-phase, V-phase, and W-phase voltages that are out of phase by 120 degrees.

The switch unit 16 is configured to turn on and off the supply of AC voltage from the AC power supply 14 to the power conversion apparatus 10. As the switch unit 16, for example, a magnetic contactor, a breaker or the like may be used, but the switch unit 16 is not limited to this.

The power conversion apparatus 10 further includes a filter 24. The filter 24 is disposed between the switch unit 16 and the converter 12. The filter 24 can remove noise transmitted from the converter 12 side to the AC power supply 14 side, and can also remove noise transmitted from the AC power supply 14 side to the converter 12 side.

The converter 12 includes a rectifier circuit 30. The rectifier circuit 30 rectifies the AC voltage supplied from the AC power supply 14 via the switch unit 16, into a DC voltage.

The rectifier circuit 30 is provided with power device units 32U, 32V, 32W corresponding respectively to different phases in the AC power supply 14.

The power device unit 32U corresponding to the U phase includes an upper arm side diode (which is a diode on an upper arm side: the same notation applies hereinafter) 36Uu, a lower arm side diode 36Ud, an upper arm side switching element (semiconductor switching element) 34Uu, and a lower arm side switching element 34Ud.

The power device unit 32V corresponding to the V phase includes an upper arm side diode 36Vu, a lower arm side diode 36Vd, an upper arm side switching element 34Vu, and a lower arm side switching element 34Vd.

The power device unit 32W corresponding to the W phase includes an upper arm side diode 36Wu, a lower arm side diode 36Wd, an upper arm side switching element 34Wu, and a lower arm side switching element 34Wd.

Reference numeral 36*u* is used to describe the upper arm side diodes in general, and the reference numerals 36Uu, 36Vu, 36Wu are used to describe individual upper arm side diodes. Reference numeral 36*d* is used to describe the lower arm side diodes in general, and the reference numerals 36Ud, 36Vd, and 36Wd are used to describe individual lower arm side diodes.

Reference numeral 34 is used to describe switching elements in general, and the reference numerals 34Uu, 34Ud, 34Vu, 34Vd, 34Wu, and 34Wd are used to describe individual switching elements. Further, the reference numeral 34*u* is used to describe the switching elements on the upper arm side in general, and the reference numerals 34Uu, 34Vu, and 34Wu are used to describe individual switching elements on the upper arm side. Reference numeral 34*d* is used to describe the lower arm side switching elements in general, and the reference numerals 34Ud, 34Vd, and 34Wd are used to describe individual lower arm side switching elements. The switching element 34 may be, for example, an insulated gate bipolar transistor (IGBT), but is not limited to this. An FET (Field Effect Transistor) may be used as the switching element 34.

The diode 36*u* on the upper arm side and the diode 36*d* on the lower arm side are connected in series with each other. The cathode of the diode 36*u* on the upper arm side is connected to a first output line (one output line) 42*u*. The anode of the diode 36*u* on the upper arm side is connected to the cathode of the diode 36*d* on the lower arm side. The anode of the diode 36*d* on the lower arm side is connected to a second output line (the other output line) 42*d*.

The switching element 34*u* on the upper arm side and the switching element 34*d* on the lower arm side are connected in series with each other. The first terminal of the switching element 34*u* on the upper arm side is connected to the cathode of the diode 36*u* on the upper arm side. When the switching element 34 is, for example, an IGBT, the first terminal is the collector, and when the switching element 34 is, for example, an FET, the first terminal is one of the source and the drain. The second terminal of the switching element 34*u* on the upper arm side is connected to the anode of the diode 36*u* on the upper arm side. When the switching element 34 is, for example, an IGBT, the second terminal is the emitter, and when the switching element 34 is, for example, an FET, the second terminal is the other of the source and the drain. The first terminal of the switching element 34*d* on the lower arm side is connected to the cathode of the diode 36*d* on the lower arm side. The second terminal of the switching element 34*d* on the lower arm side is connected to the anode of the diode 36*d* on the lower arm side.

The anode of the diode 36Uu on the upper arm side, the second terminal of the switching element 34Uu on the upper arm side, the cathode of the diode 36Ud on the lower arm side, and the first terminal of the switching element 34Ud on the lower arm side are connected to a node 38U, and the node 38U is supplied with a voltage for the U phase, that is, a U-phase voltage.

The anode of the diode 36Vu on the upper arm side, the second terminal of the switching element 34Vu on the upper arm side, the cathode of the diode 36Ud on the lower arm side, and the first terminal of the switching element 34Ud on the lower arm side are connected to a node 38V, and the node 38V is supplied with a voltage for the V phase, that is, a V-phase voltage.

The anode of the diode 36Wu on the upper arm side, the second terminal of the switching element 34Wu on the upper arm side, the cathode of the diode 36Wd on the lower arm side, and the first terminal of the switching element 34Wd on the lower arm side are connected to a node 38W, and the node 38W is supplied with a voltage for the W phase, that is, a W-phase voltage.

The power conversion apparatus 10 further includes a smoothing capacitor 18. The smoothing capacitor 18 is disposed downstream of the converter 12. A first end (one end) of the smoothing capacitor 18 is connected to the first output line 42*u*. A second end (the other end) of the smoothing capacitor 18 is connected to the second output line 42*d*. The smoothing capacitor 18 smooths the DC voltage output from the converter 12, that is, the DC voltage rectified by the rectifier circuit 30.

The power conversion apparatus 10 further includes a resistor 20. The resistor 20 is provided on the first output line 42*u*. The resistor 20 is located between the converter 12 and the smoothing capacitor 18. A first end (one end) of the resistor 20 is electrically connected to the diodes 36*u* on the upper arm side and the switching elements 34*u* on the upper arm side via the first output line 42*u*. The second end (the other end) of the resistor 20 is connected to the first end of the smoothing capacitor 18 via the first output line 42*u*.

The power conversion apparatus 10 further includes a switch 22. The switch 22 is connected in parallel with the resistor 20. The switch 22 can short-circuit the resistor 20. When the switch 22 is closed, the ends of the resistor 20 are short-circuited. When the switch 22 is opened, the ends of the resistor 20 are not short-circuited.

The converter 12 starts conversion from AC voltage to DC voltage with the switch 22 open. Therefore, when the converter 12 starts conversion from the AC voltage to the DC voltage, the resistor 20 can prevent a large inrush current from flowing into the smoothing capacitor 18. After sufficient charging of the smoothing capacitor 18, the switch 22 is closed.

The filter 24 includes reactors 46U, 46V, and 46W. First ends of the reactors 46U, 46V, 46W are connected to first input/output terminals 44U, 44V, 44W of the filter 24, respectively. AC voltage is supplied from the AC power supply 14 to the first input/output terminals 44U, 44V, 44W of the filter 24 through the switch unit 16.

The filter 24 further includes reactors 48U, 48V, 48W. The second ends of the reactors 46U, 46V, 46W are connected to first ends of the reactors 48U, 48V, 48W, respectively. The second ends of the reactors 48U, 48V, 48W are connected to second input/output terminals 50U, 50V, 50W of the filter 24, respectively. Nodes 38U, 38V, 38W are connected to the second input/output terminals 50U, 50V, 50W of the filter 24, respectively.

The filter 24 further includes resistors 52U, 52V, 52W. The resistors 52U, 52V, 52W are damping resistors, which are to suppress resonance phenomena. Nodes 53U, 53V, 53W that respectively connected to the second ends of reactors 46U, 46V, 46W and the first ends of reactors 48U, 48V, 48W, are connected to first ends of resistors 52U, 52V, 52W, respectively.

The filter 24 further includes capacitors 54U, 54V, 54W. Reference numeral 54 is used to describe capacitors in general, and reference numerals 54U, 54V and 54W are used to describe individual capacitors. First ends of the capacitors 54U, 54V, 54W are connected to second ends of the resistors 52U, 52V, 52W, respectively.

The filter 24 further includes resistors 56U, 56V, 56W. Reference numeral 56 is used to describe resistors in general, and reference numerals 56U, 56V, and 56W are used to describe individual resistors. The resistors 56U, 56V, 56W are connected in parallel to the capacitors 54U, 54V, 54W, respectively. The resistors 56U, 56V, 56W are configured to discharge the charges stored in the capacitors 54U, 54V, 54W.

The second ends of the capacitors 54U, 54V, 54W are connected to each other.

The power conversion apparatus 10 further includes a voltage sensor (detection unit) 28. A first input terminal of the voltage sensor 28 is connected to the first end of the smoothing capacitor 18. The second input terminal of the voltage sensor 28 is connected to the second end of the smoothing capacitor 18. The voltage sensor 28 can detect the voltage across the smoothing capacitor 18, that is, the voltage between both ends of the smoothing capacitor 18.

The power conversion apparatus 10 further includes a PWM control circuit 29. The PWM control circuit 29 is configured to perform PWM control of the converter 12. Specifically, the PWM control circuit 29, based on the signal (command) supplied from the control unit 64, applies a voltage to the third terminal (gate) of each switching element 34, to thereby perform switching of the switching element 34. The PWM control circuit 29 can adjust the output voltage, that is, adjust the voltage across the smoothing capacitor 18 by appropriately switching the switching elements 34.

The power conversion apparatus 10 further includes a control device 26. The control device 26 controls the entire power conversion apparatus 10. The control device 26 includes a processing unit 58 and a storage unit 60. The processing unit 58 may be configured of, for example, a CPU (Central Processing Unit) and the like, but is not limited to this. The storage unit 60 includes, for example, an unillustrated volatile memory and an unillustrated non-volatile memory. Examples of the volatile memory include RAM (Random Access Memory) and the like. Examples of the non-volatile memory include ROM (Read Only Memory) and flash memory. Programs, data, tables, and the like may be stored in the storage unit 60.

The processing unit 58 includes a determination unit 62 and a control unit 64. The determination unit 62 and the control unit 64 may be realized by the programs stored in the storage unit 60 being executed by the processing unit 58.

The determination unit 62 determines whether or not the voltage across the smoothing capacitor 18 is equal to or greater than a voltage threshold (i.e., whether the voltage across the smoothing capacitor the voltage threshold). Specifically, the determination unit 62 determines the voltage across the smoothing capacitor 18, based on information supplied from the voltage sensor 28. The voltage threshold is a threshold value for determining whether or not the voltage across the smoothing capacitor 18 is sufficiently large.

The control unit 64 can control opening and closing (switching operation) of the switch unit 16. When the switch unit 16 is closed, the AC voltage from the AC power supply 14 is supplied to the converter 12 via the switch unit 16 and the filter 24. When the switch unit 16 is opened, the AC voltage is not supplied to the filter 24 and the converter 12.

The control unit 64 can control opening and closing (switching operation) of the switch 22. As described above, when the switch 22 is closed, both ends of the resistor 20 are short-circuited. As described above, when the switch 22 is opened, both ends of the resistor 20 are not short-circuited.

The control unit 64 can generate a signal (command) to be supplied to the PWM control circuit 29, based on, for example, information acquired by a voltage sensor, a current sensor, or the like (not shown). The control unit 64 can adjust the output voltage, that is, the voltage across the smoothing capacitor 18 by appropriately switching the switching elements 34 using the PWM control circuit 29.

A voltage corresponding to the three-phase AC line voltage is applied between both ends of the capacitor 54. Electric charge according to the applied voltage is stored in the capacitor 54. When the switch unit 16 is changed from the closed state to the open state, the electric charge accumulated on the capacitor 54 starts to be discharged via the resistor 56 at that point of time. When only a relatively short period has passed after changing of the switch unit 16 from the closed state to the open state, the electric charge accumulated in the capacitor 54 has not been sufficiently discharged, so that the voltage across the capacitor 54 remains large. Transition (i.e., changing) of the switch unit 16 from the open state to the closed state may cause a resonant voltage in the filter 24. When the switch unit 16 that has been changed to the open state is returned again to the closed state in a relatively short period and when the phase of the line voltage at the time of changing the switch unit 16 to the open state is opposite to the phase of the line voltage at the time of returning the switch unit 16 to the closed state, the peak resonant voltage can become significantly large. When a resonance voltage having such a significantly large peak is applied to the switching element 34, there is a risk that the switching element 34 will be broken.

When the switch unit 16 that has been transitioned to the open state is returned again to the closed state in a relatively short period, the voltage across the smoothing capacitor 18 remains large. If the resistor 20 is short-circuited by the switch 22, the peak resonance voltage is clamped at the voltage of the smoothing capacitor 18 and hence does not become significantly large. To achieve this, in the present embodiment, when the switch unit 16 that has been transitioned to the open state is returned again to the closed state in a relatively short period, that is, when the voltage across the smoothing capacitor 18 is equal to or greater than a voltage threshold, the switch unit 16 is transitioned from the open state to the closed state with the switch 22 closed. Here, even if the switch unit 16 is transitioned from the open state to the closed state with the switch 22 closed, no large inrush current will flow into the smoothing capacitor 18 because the voltage of the smoothing capacitor 18 is large.

Figure 2A:
FIGS. 2A and 2B are diagrams showing examples of changes in voltage of each part when a switch unit is changed from an open state to a closed state.
Figure 2B:
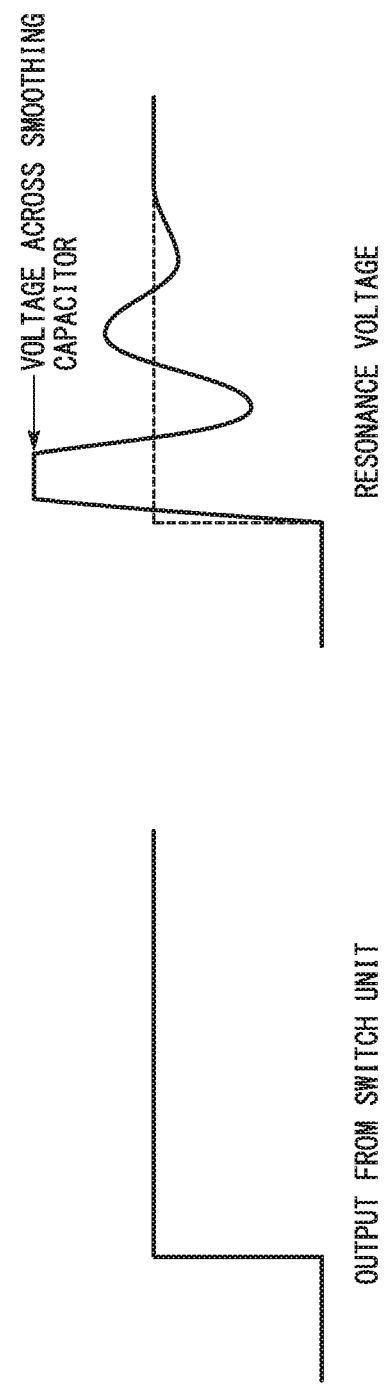
Figure 3:
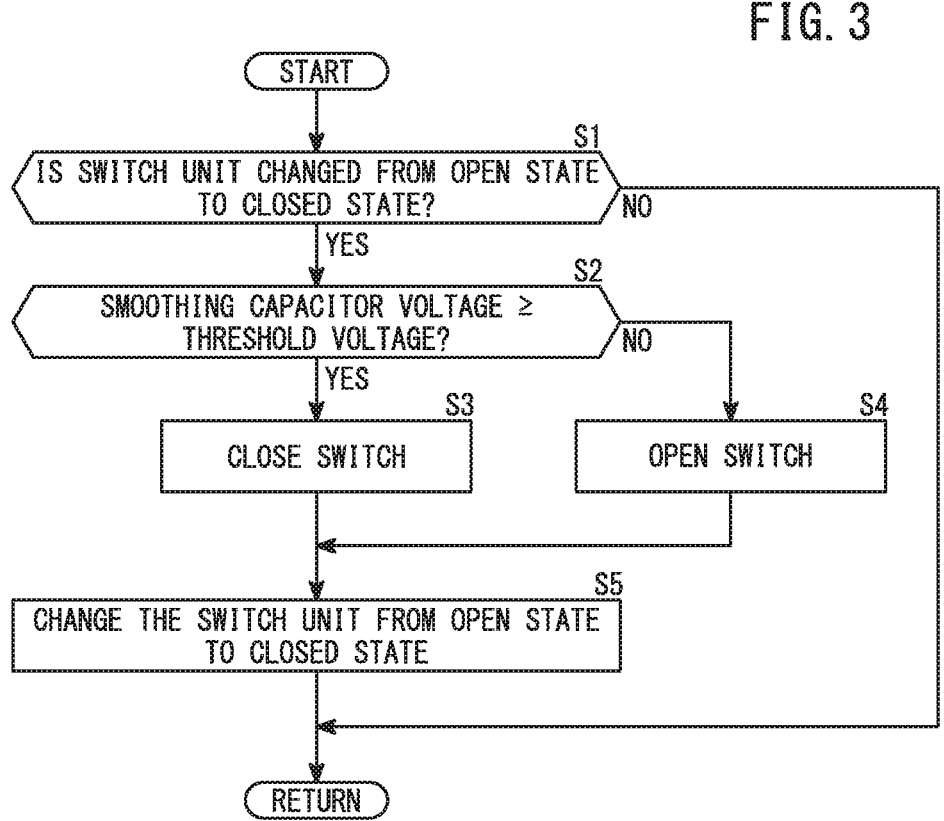
FIG. 3 is a flowchart showing the operation of a power conversion apparatus according to one embodiment.

FIGS. 2A and 2B are diagrams showing examples of changes in voltage of each part when a switch unit is changed from the open state to the closed state. FIG. 2A shows a comparative example, in which the resistor 20 is not short-circuited by the switch 22. FIG. 2B shows an example of the present embodiment, in which the resistor 20 is short-circuited by the switch 22. Examples of the voltage on the output side of the switch unit 16 are shown on the left side in FIGS. 2A and 2B. Examples of the resonance voltage are shown on the right side in FIGS. 2A and 2B. Here, to simplify the explanation, a case where a DC voltage is applied to the filter 24 via the switch unit 16 is shown as an example. FIGS. 2A and 2B show cases where the voltage across the smoothing capacitor 18 is sufficiently large.

In a case where the switch unit 16 is transitioned from the open state to the closed state without the resistor 20 being short-circuited by the switch 22, that is, in a case of the comparative example, the peak of the resonance voltage becomes significantly large, as shown in FIG. 2A.

On the other hand, in a case where the switch unit 16 is transitioned from the open state to the closed state with the resistor 20 being short-circuited by the switch 22, that is, in the case of the present embodiment, as shown in FIG. 2B, the peak of resonance voltage is clamped (limited) by the voltage across the smoothing capacitor 18.

As described above, in the present embodiment, when the switch unit 16 that has been changed to the open state is returned again to the closed state in a relatively short period, that is, when the voltage across the smoothing capacitor 18 is sufficiently large, the switch unit 16 is transitioned (changed) from the open state to the closed state with the switch 22 closed. Since the resistor 20 is short-circuited by the switch 22, the peak of the resonance voltage is clamped at the voltage of the smoothing capacitor 18. Since the peak of the resonance voltage does not excessively increase, it is possible, in this embodiment, to favorably prevent the switching element 34 and the like from being broken.

On the other hand, when the switch unit 16 that has been transitioned to the open state is returned again to the closed state after a sufficiently long period, the electric charge accumulated on the capacitor 54 is sufficiently discharged through the resistor 56, so that the voltage across the capacitor 54 is sufficiently lowered. That the voltage across the smoothing capacitor 18 is sufficiently lowered means that the time period from the time of transitioning the switch unit 16 to the open state until the time of returning the switch unit again to the closed state is sufficiently long, i.e., the voltage across the capacitor 54 has sufficiently lowered. When the voltage across the capacitor 54 is sufficiently low, even if the phase of the voltage when the switch unit 16 has been transitioned to the open state and the phase of the voltage when the switch unit 16 has been returned to the closed state are opposite to each other, the peak of the resonance voltage does not become significantly large. Therefore, in the present embodiment, when the switch unit 16 that has been transitioned to the open state is returned again to the closed state after a relatively long period, that is, when the voltage across the smoothing capacitor 18 is less than a voltage threshold, the switch unit 16 is changed from the opened state to the closed state with the switch 22 being in the open state. Since the switch unit 16 is changed from the open state to the closed state with the switch 22 open, the resistor 20 can prevent a large inrush current from flowing through the smoothing capacitor 18.

The operation of the power conversion apparatus 10 according to this embodiment will be described with reference to FIG. 3. FIG. 3 is a flowchart showing the operation of the power conversion apparatus according to this embodiment. FIG. 3 explains the operation after the switch unit 16 has changed from the closed state to the open state.

At step S1, the control unit 64 determines whether to change (transition) the switch unit 16 from the open state to the closed state. When the switch unit 16 is determined to be changed from the open state to the closed state (YES at step S1), the process proceeds to step S2. When the switch unit 16 is not transitioned from the open state to the closed state (NO at step S1), the process shown in FIG. 3 is ended.

At step S2, the determination unit 62 determines whether the voltage across the smoothing capacitor 18, that is, the voltage between both ends of the smoothing capacitor 18 is equal to or greater than a voltage threshold (i.e., whether the voltage across the smoothing capacitor the voltage threshold). When the voltage across the smoothing capacitor 18 is equal to or greater than the voltage threshold (YES at step S2), the process proceeds to step S3. When the voltage across the smoothing capacitor 18 is less than the voltage threshold (NO at step S2), the process proceeds to step S4.

At step S3, the control unit 64 closes the switch 22. When the switch 22 has been already closed, the control unit 64 keeps the switch 22 in the closed state. Thereafter, the process proceeds to step S5.

At step S4, the control unit 64 opens the switch 22. When the switch 22 has already been opened, the control unit 64 keeps the switch 22 in the opened state. Thereafter, the process proceeds to step S5.

At step S5, the control unit 64 causes the switch unit 16 to transition from the open state to the closed state. In this way, the process shown in FIG. 3 is completed.

As described above, according to the present embodiment, when the voltage across the smoothing capacitor 18 is less than the voltage threshold, the switch unit 16 is transitioned from the open state to the closed state with the switch 22 being in the open state, whereas when the voltage across the smoothing capacitor 18 is equal to or greater than the voltage threshold, the switch unit 16 is transitioned from the open state to the closed state with the switch 22 being in the closed state. According to the present embodiment, when the voltage across the capacitor 54 is large, the resistor 20 is short-circuited by the switch 22, so that the peak of the resonance voltage is clamped at the voltage across the smoothing capacitor 18. According to this embodiment, since the peak of the resonance voltage does not excessively increase, it is possible to favorably prevent the switching element 34 and the like from being broken.

(Modification)

Figure 4:
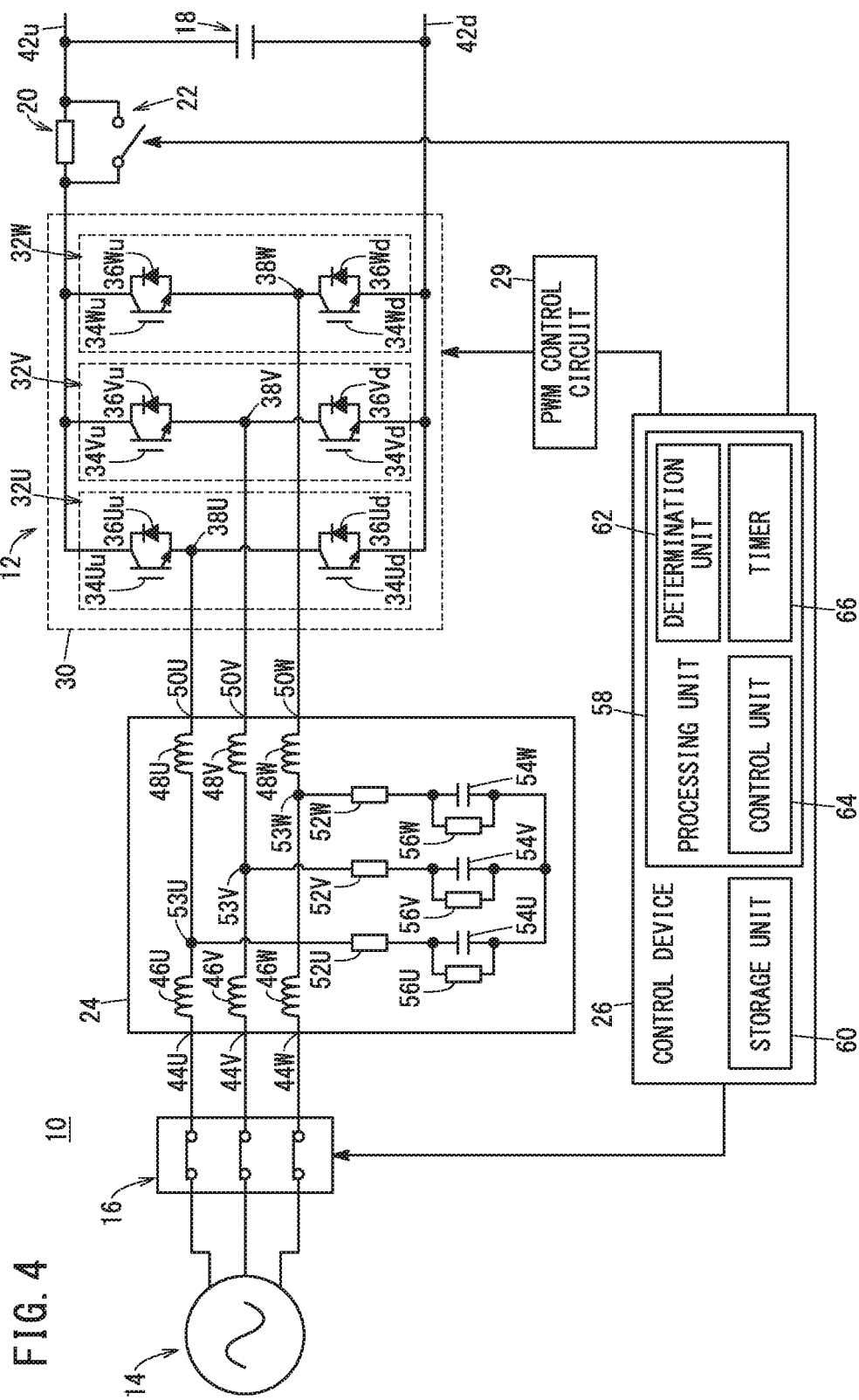
FIG. 4 is a diagram showing a configuration of a power conversion apparatus according to a modification of the embodiment.

A power conversion apparatus 10 according to a modification of this embodiment will be described with reference to FIG. 4. FIG. 4 is a diagram showing a configuration of a power conversion apparatus according to the modification.

The power conversion apparatus 10 according to the modification determines whether or not the voltage across the smoothing capacitor 18 is equal to or greater than a voltage threshold, based on the elapsed time from when the switch unit 16 has transitioned from the closed state to the open state.

As shown in FIG. 4, the voltage sensor 28 (see FIG. 1) is not provided in this modification, whereas the processing unit 58 further includes a timer 66. The timer 66 can be realized by a program stored in the storage unit 60 being executed by the processing unit 58.

The control unit 64 outputs information indicating that the switch unit 16 has been changed from the closed state to the open state to the timer 66 when the switch unit 16 has been changed from the closed state to the open state. The timer 66 counts the elapsed time from when the switch unit 16 has transitioned from the closed state to the open state. The elapsed time counted by the timer 66 is supplied to the determination unit 62. The determination unit 62 determines whether or not the voltage across the smoothing capacitor 18 is equal to or greater than a voltage threshold (i.e., whether the voltage across the smoothing capacitor the voltage threshold), based on the elapsed time counted by the timer 66.

The operation of the power conversion apparatus 10 according to this modification is similar to that of the power conversion apparatus 10 described above with reference to FIG. 3, so that the description is omitted.

As described above, whether or not the voltage across the smoothing capacitor 18 is equal to or greater than the voltage threshold may be determined based on the elapsed time from when the switch unit 16 has transitioned from the closed state to the open state.

The above embodiments are summarized as follows.

A power conversion apparatus (10) includes: a converter (12) configured to convert AC voltage supplied from an AC power supply (14) via a switch unit (16), into DC voltage; a smoothing capacitor (18) configured to smooth the DC voltage output from the converter; a resistor (20) disposed between the converter and the smoothing capacitor, and configured to suppress electric current flowing into the smoothing capacitor; a switch (22) connected in parallel with the resistor and configured to short-circuit the both ends of the resistor; a filter (24), including reactors (46U, 46V, 46W, 48U, 48V, 48W) and capacitors (54U, 54V, 54W) and disposed between the switch unit and the converter, the filter being configured to remove noise; and a control unit (64) configured to control the opening and closing (switching operation) of the switch unit and the switch. The control unit is configured to transition (change) the switch unit from the open state to the closed state with the switch being in an open state if the voltage across the smoothing capacitor is lower than a voltage threshold, and is configured to transition the switch unit from the open state to the closed state with the switch being in a closed state if the voltage across the smoothing capacitor is equal to or greater than the voltage threshold. According to this configuration, since the resistor is short-circuited by the switch when the voltage across the smoothing capacitor is sufficiently large, that is, when the voltage between both ends of the capacitor is large, the peak of the resonance voltage is clamped at the voltage across the smoothing capacitor. Since the peak of the resonance voltage will not become significantly large, this configuration makes it possible to favorably prevent the switching element 34 etc. from being broken.

The power conversion apparatus may further include a detection unit (28) configured to detect the voltage across the smoothing capacitor, and the control unit may be configured to determine whether or not the voltage across the smoothing capacitor is equal to or greater than the voltage threshold, based on the voltage detected by the detection unit.

The control unit may be configured to determine whether or not the voltage across the smoothing capacitor is equal to or greater than the voltage threshold, based on the elapsed time from when the switch unit has transitioned from the closed state to the open state. This configuration does not need to have a detection unit to detect the voltage across the smoothing capacitor, and hence contributes to reducing costs.

The converter may be a pulse width modulation converter.

A control method of a power conversion apparatus to control a power conversion apparatus including: a converter configured to convert AC voltage supplied from an AC power supply via a switch unit, into DC voltage; a smoothing capacitor configured to smooth the DC voltage output from the converter; a resistor disposed between the converter and the smoothing capacitor and configured to suppress electric current flowing into the smoothing capacitor; a switch connected in parallel with the resistor and configured to short-circuit the both ends of the resistor; a filter, including reactors and capacitors, and disposed between the switch unit and the converter, the filter being configured to remove noise; and a control unit configured to control opening and closing (switching operation) of the switch unit and the switch, and the method includes: a step (S2) of determining whether or not the voltage across the smoothing capacitor is equal to or greater than a voltage threshold; and a step (S5) of transitioning (changing) the switch unit from the open state to the closed state, wherein the step of transitioning the switch unit from the open state to the closed state includes changing the switch unit from the open state to the closed state with the switch being in the open state if the voltage across the smoothing capacitor is lower than the voltage threshold (S4,S5), and changing the switch unit from the open state to the closed state with the switch being in a closed state if the voltage across the smoothing capacitor is equal to or greater than the voltage threshold (S3, S5).

The present invention is not particularly limited to the embodiment described above, and various modifications are possible without departing from the essence and gist of the present invention.

What is claimed is:
1. A power conversion apparatus, comprising:
   a converter configured to convert alternate-current voltage supplied from an alternate-current power supply via a switch unit, into direct-current voltage;
   a smoothing capacitor configured to smooth the direct-current voltage output from the converter;
   a resistor disposed between the converter and the smoothing capacitor, and configured to suppress electric current flowing into the smoothing capacitor;
   a switch connected in parallel with the resistor and configured to short-circuit both ends of the resistor;
   a filter including reactors and capacitors, and disposed between the switch unit and the converter, the filter being configured to remove noise; and
   a control unit configured to control opening and closing of the switch unit and the switch,
   wherein the control unit is configured to change the switch unit from an open state to a closed state with the switch being in an open state if a voltage across the smoothing capacitor is lower than a voltage threshold, and is configured to change the switch unit from the open state to the closed state with the switch being in a closed state if the voltage across the smoothing capacitor is equal to or greater than the voltage threshold.

2. The power conversion apparatus according to claim 1, further comprising a detection unit configured to detect the voltage across the smoothing capacitor,
wherein the control unit is configured to determine whether or not the voltage across the smoothing capacitor is equal to or greater than the voltage threshold, based on the voltage detected by the detection unit.

3. The power conversion apparatus according to claim 1, wherein the control unit is configured to determine whether or not the voltage across the smoothing capacitor is equal to or greater than the voltage threshold, based on elapsed time from when the switch unit has changed from the closed state to the open state.

4. The power conversion apparatus according to claim 1, wherein the converter is a pulse width modulation converter.

5. A control method of a power conversion apparatus including: a converter configured to convert alternate-current voltage supplied from an alternate-current power supply via a switch unit, into direct-current voltage; a smoothing capacitor configured to smooth the direct-current voltage output from the converter; a resistor disposed between the converter and the smoothing capacitor and configured to suppress electric current flowing into the smoothing capacitor; a switch connected in parallel with the resistor and configured to short-circuit both ends of the resistor; a filter including reactors and capacitors, and disposed between the switch unit and the converter, the filter being configured to remove noise; and a control unit configured to control opening and closing of the switch unit and the switch, the control method comprising:
a step of determining whether or not a voltage across the smoothing capacitor is equal to or greater than a voltage threshold; and
a step of changing the switch unit from an open state to a closed state,
wherein the step of changing the switch unit from the open state to the closed state comprises changing the switch unit from the open state to the closed state with the switch being in an open state if the voltage across the smoothing capacitor is lower than the voltage threshold, and changing the switch unit from the open state to the closed state with the switch being in a closed state if the voltage across the smoothing capacitor is equal to or greater than the voltage threshold.

* * * * *